United States Patent [19]

Somers et al.

[11] Patent Number: 4,845,556
[45] Date of Patent: Jul. 4, 1989

[54] VIDEO SPOT DETECTOR

[75] Inventors: Ralph M. Somers, West Chester; Ronald G. Alcoke, Cincinnati; Robert L. McDonnell, Loveland, all of Ohio

[73] Assignee: General Electric Company, Cincinnati, Ohio

[21] Appl. No.: 114,958

[22] Filed: Oct. 30, 1987

[51] Int. Cl.[4] .................... H04N 7/00; H04N 7/18
[52] U.S. Cl. ............................ 358/101; 358/105; 358/107; 356/373; 356/375
[58] Field of Search ............ 358/101, 105, 107, 108; 250/561, 221, 222.1; 364/490; 356/373, 375, 400, 372

[56] References Cited

U.S. PATENT DOCUMENTS

| | | | |
|---|---|---|---|
| 3,761,910 | 9/1973 | Vidovic | 340/258 R |
| 3,781,468 | 12/1973 | Chomet et al. | 178/6.8 |
| 3,825,676 | 7/1974 | Ramsden, Jr. | 178/6.8 |
| 3,976,382 | 8/1976 | Westby | 356/120 |
| 4,318,081 | 3/1982 | Yoshida | 358/101 |
| 4,380,026 | 4/1983 | Kubota | 358/101 |
| 4,390,955 | 6/1983 | Arimura | 358/101 |
| 4,412,121 | 10/1983 | Kremers et al. | 219/124.34 |
| 4,460,921 | 7/1984 | Henry et al. | 358/107 |
| 4,564,756 | 1/1986 | Johnson | 250/561 |
| 4,617,470 | 10/1986 | Horikawa | 250/561 |
| 4,631,581 | 12/1986 | Carlsson | 358/107 |
| 4,688,088 | 8/1987 | Hamazaki et al. | 358/101 |
| 4,710,641 | 12/1987 | Aulds | 250/561 |
| 4,725,884 | 2/1988 | Gurnell et al. | 358/107 |
| 4,771,182 | 9/1988 | Fulkerson | 250/561 |

Primary Examiner—Howard W. Britton
Assistant Examiner—John K. Peng
Attorney, Agent, or Firm—James M. Stover; Derek P. Lawrence

[57] ABSTRACT

A non-contacting sensing system for measuring dimensions or determining the position of an object, such as a workpiece in an automated machining process. A small diameter light beam is projected and focused at a predetermined location. A television camera, positioned to view the location, receives light reflected from the location and generates a video signal. This signal is provided to a circuit which detects changes in signal magnitude indicative of a change in position of the object relative to the predetermined location.

10 Claims, 2 Drawing Sheets

VIDEO SPOT DETECTOR

The present invention relates in general to a non-contact sensing method and apparatus for measuring dimensions or locations of objects and more specifically to a non-contact edge location sensor for automated machining or laser drilling operations.

BACKGROUND OF THE INVENTION

In the field of automated machining, a numerically controlled machine tool positioning system is often used in conjunction with a probe sensor to measure certain features of a workpiece that is to be drilled, cut, welded or machined. During a probing cycle, either the workpiece or the probe is moved by the positioning system until contact between the workpiece and probe occurs. Upon contact the probing system provides a "trip" signal input to the positioning system regarding the location of the workpiece. Typically, the probe sensor is a mechanical stylus or other contact probe. The probe has to be made compliant enough to withstand accidental shocks and overtravel, but still be stiff enough for repeated probe cycles. When used in laser drilling applications, the probe must be displaced from the drilling light path to prevent destruction of the probe by the laser beam.

In many machine tools, including lasers used for drilling, cutting or welding, a visible Helium Neon laser beam is used for positioning and alignment of the workpiece by an operator. In addition, many machine tools are equipped with a television camera system to view the machining operation. The present invention utilizes these existing components to provide the "trip" signal input to the positioning system. Thus, the present invention can be installed into an existing machine tool system easily and at a relatively small cost in comparison to a contact probing system.

OBJECTS OF THE INVENTION

It is a primary object of the invention to provide a method and apparatus for locating a workpiece in a manufacturing process which are not subject to the foregoing disadvantages.

It is an additional object of the present invention to provide a new and improved method and apparatus for locating a workpiece in an automated machining process which dispense with a mechanical stylus or contact probe.

It is a further object of the present invention to provide a new and useful method and apparatus which utilizes a conventional light beam source and a television camera for locating a workpiece in an automated machining process.

SUMMARY OF THE INVENTION

In accordance with the principles of the present invention, there are provided a method and apparatus for locating an object, such as a workpiece in a manufacturing process. A focused light beam is projected onto a predetermined location and a sensing device senses the light reflected from the location. The sensing device provides a signal indicative of the intensity of reflected light. Changes in light intensity will occur, for example, with the presence or absence of an object at the predetermined location. This signal is applied to a circuit which detects changes in signal magnitude so as to indicate the change of position of the object relative to the predetermined location.

The above and other objects of the present invention together with the features and advantages thereof will become apparent from the following detailed specification when read in conjunction with the accompanying drawings in which applicable reference numerals have been carried forward.

DETAILED DESCRIPTION OF THE INVENTION

Figure 1:
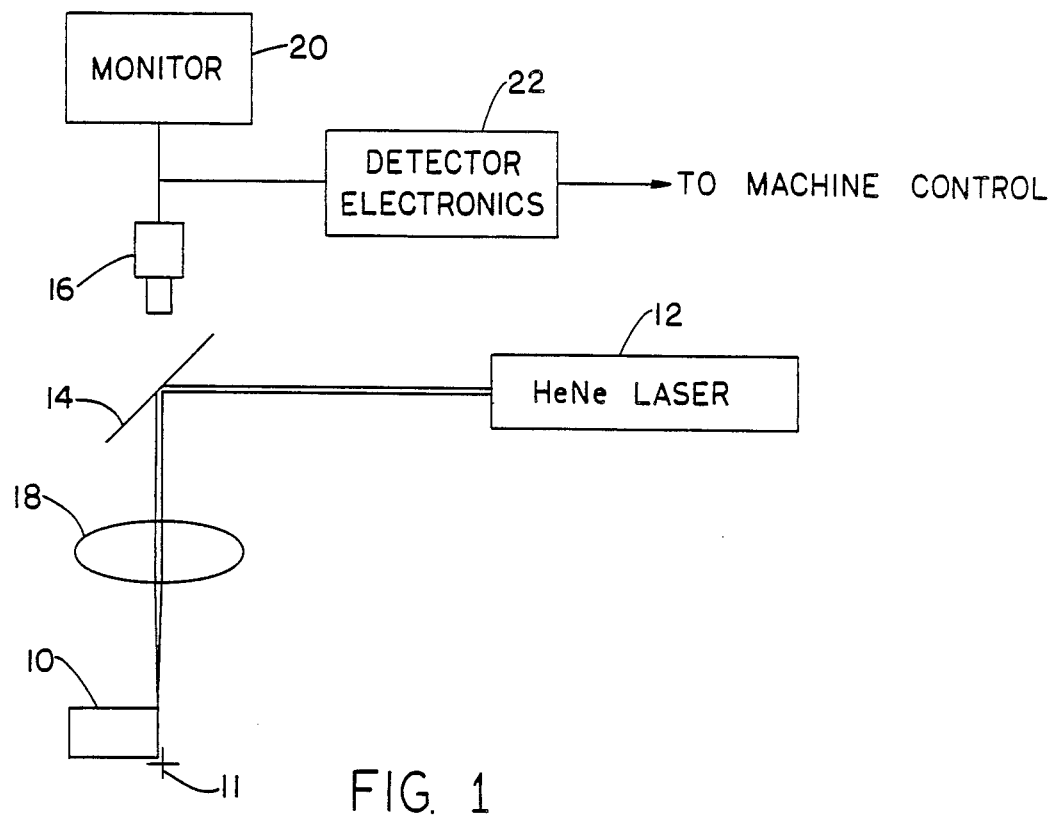
FIG. 1 is a block diagram of a preferred embodiment of the present invention.

Referring now to the drawings, FIG. 1 is a block diagram of a preferred embodiment of the invention. The major components of the invention include a low power visible Helium Neon laser device 12 for generating a collimated light beam 13, a dichroic mirror 14, a television camera 16 connected to a monitor 20, and an imaging lens 18. A detector electronics circuit 22 is connected to receive the video output of camera 16.

In operation, laser device 12 generates HeNe laser beam 13 which is directed at the reflective surface of dichroic mirror 14. Mirror 14 redirects laser beam 13, to imaging lens 18 which functions to focus the light beam at a predetermined location 11. Television camera 16 is positioned to view location 11 through dichroic mirror 14 and imaging lens 18. Light reflected from the predetermined location is received by camera 16 and converted by the scanning mechanism and photosensitive element within the camera into a video signal comprising a series of pulses. The height of each pulse is proportional to the amount of light reflected from one picture element or pixel of the scene viewed by the camera. This video signal is coupled to monitor 20 and to detector electronics circuit 22.

When an object 10 is positioned at the location to which laser beam 13 is directed, there is an increase in the intensity of reflected light from the location and a proportional increase in the magnitude of the video pulses generated by camera 16. Circuit 22 detects changes in the video output of camera 16 indicative of a change of position of object 10 relative to the location to which laser beam 13 is directed, and provides a trip signal to the machine tool positioning system (not shown) which controls the operation of the machining process.

Figure 2:
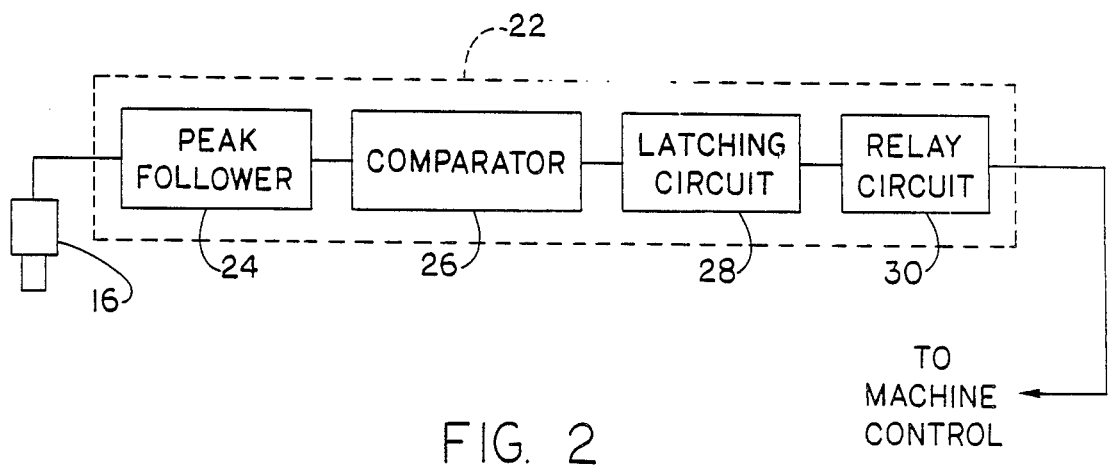
FIG. 2 is an expanded block diagram of a portion of FIG. 1, showing one arrangement of components within the detector electronics.

FIG. 2 is an expanded block diagram illustrating one arrangement of components within circuit 22. Included in circuit 22 is a peak follower 24 coupled to receive the video output of camera 16 and a comparator 26 responsive to a comparison between the output of peak follower 24 and a reference signal to provide a binary output signal. A latching circuit 28 is responsive to the output of comparator 26 to provide an activating signal having a HIGH value whenever a HIGH input value is provided by comparator 26 and to hold a HIGH value for a predetermined time interval after the HIGH input value is removed. Relay circuit 30 is responsive to the binary output signal of latching circuit 28 to provide a trip signal to the machine tool positioning system.

Figure 3:
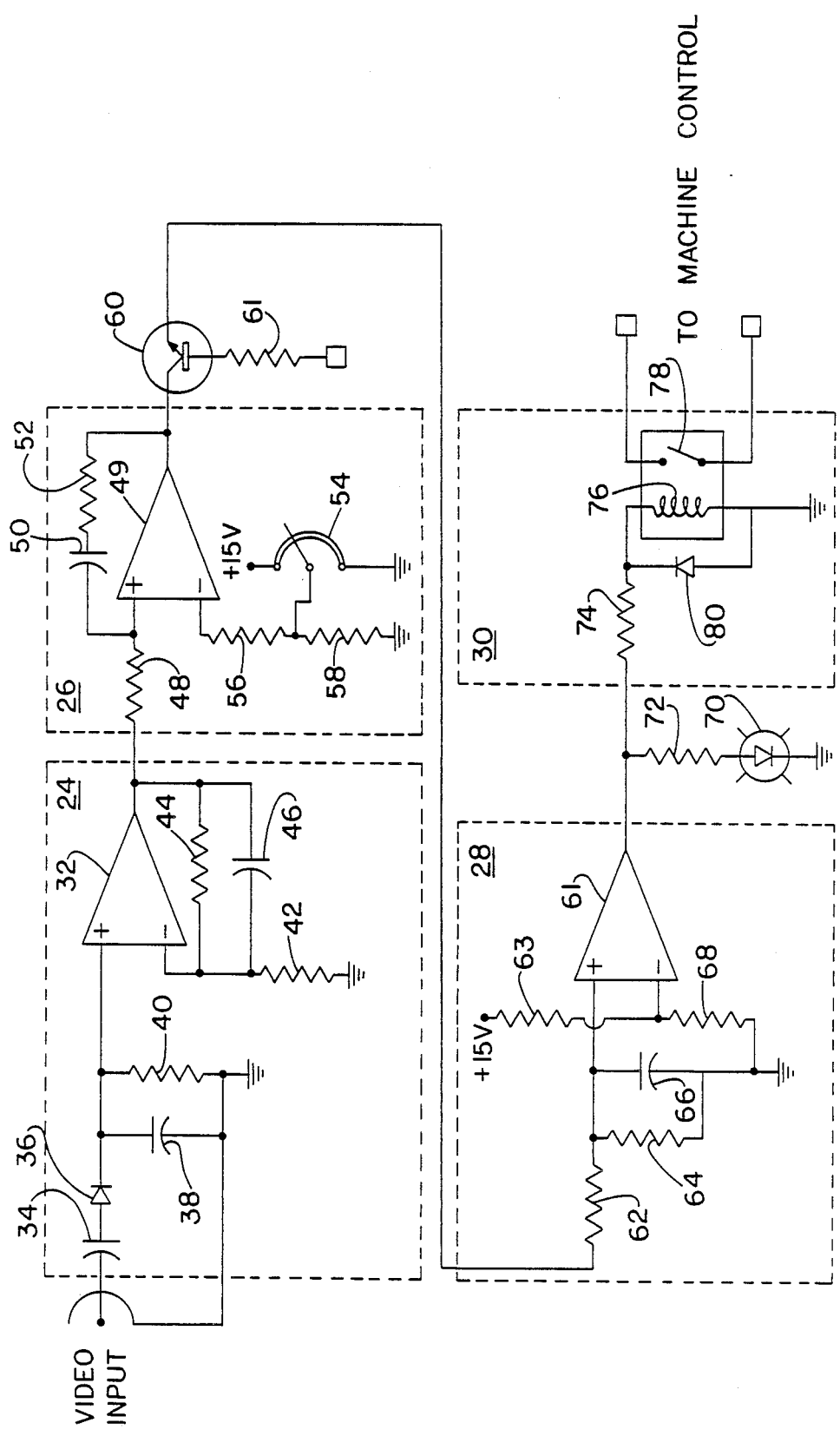
FIG. 3 is a circuit diagram of the detector electronics shown in FIG. 2.

FIG. 3, illustrates the circuit of FIG. 2 in greater detail. Peak follower 24 includes an operational amplifier 32. The video signal from camera 16 is coupled to the non-inverting input of op-amp 32 through a capacitor 34 and diode 36 connected in series. A capacitor 38 and a resistor 40 are connected in parallel between the non-inverting input of op-amp 32 and ground. The inverting input of op-amp 32 is connected to ground through resistor 42. An additional capacitor 46 and resistor 44 are connected in parallel between the output and inverting input of the op-amp. The output of peak follower 24 is a derivative signal corresponding to the envelope of the video signal.

Within comparator 26, the derivative signal is coupled to the non-inverting input of an op-amp 49 through a resistor 48. A capacitor 50 is connected in series with a resistor 52 between the output and non-inverting input of op-amp 49. The inverting input of op-amp 49 is connected to ground through the series combination of resistors 56 and 58. A potentiometer 54 is connected between a 15 volt power supply (not shown) and ground and also to the node between resistors 56 and 58. Potentiometer 54 is used to generate a reference voltage signal to which the output of peak follower 24 is compared. The output of comparator 26 is a binary signal having a HIGH state when the derivative signal exceeds the reference signal and a LOW state whenever the reference signal exceeds the derivative signal.

Latching circuit 28 includes an op-amp 61 having its non-inverting input coupled to the output of comparator 26 through a resistor 62. The non-inverting input is also connected to ground through a resistor 64 and a capacitor 66 connected in parallel therewith. The inverting input of op-amp 61 is connected to a 15 volt power supply (not shown) through a resistor 63, and to ground through a resistor 68.

Relay circuit 30 includes a relay coil 76 having one end coupled to the output of latching comparator 28 through a resistor 74. The other end of relay coil 76 is connected to ground. A diode 80 is connected in parallel with relay coil 76 to prevent reverse current flow through the coil. A trip signal is provided at the output of relay circuit 30 by the operation of a reed switch 78 in response to current flow through coil 76. The trip signal can be either a voltage or current provided to one terminal of reed switch 78 and conducted through the switch when in its closed position.

The detector electronics circuit shown in FIG. 3 also includes an enabling means comprising a transistor 60 connected between comparator 26 and latching circuit 28. Signal transmission to latching circuit 28 is impeded unless a suitable voltage is applied to the base of transistor 60 through resistor 61. A resistor 72 and a light emitting diode 70 are connected in series between the output of latching circuit 28 and ground to indicate the generation of a trip signal.

Acceptable values for the components in the peak follower, comparator, latching circuit, and relay stages are as follows:

Capacitors 34 and 50: 0.1 microfarads
Capacitor 38: 0.01 microfarads
Capacitor 46: 0.022 microfarads
Capacitor 66: 2.2 microfarads
Resistors 40 and 60: 10,000 ohms
Resistors 42 and 58: 500 ohms
Resistor 44: 3,300 ohms
Resistor 48: 9,300 ohms
Resistor 52: 39,000 ohms
Resistor 56: 5,000 ohms
Resistor 61: 68,000 ohms
Resistor 64: 330,000 ohms
Resistor 63: 250,000 ohms
Resistor 68: 25,000 ohms
Resistor 72: 1,200 ohms
Resistor 74: 680 ohms It should be noted however, that the values listed above are exemplary only and are not intended to be limiting.

The construction and operation of peak follower comparators, latching circuits and relays, and the use of operational amplifiers in such circuits is well known in the art. Circuit constructions differing from those described above, yet functionally equivalent, will be readily apparent to those skilled in the art.

The output of comparator 26 comprises a series of binary pulses occurring in rapid succession. The latching circuit is required because the machine tool positioning system will not function properly with multiple inputs in rapid succession. Latching circuit 28, constructed as described above, generates a binary output having a HIGH value when a binary pulse is received from comparator 26. The output remains HIGH thereafter for a period of 50 to 150 msec after the pulse disappears. The occurrence of another pulse during this 50-150 msec period, will further increase the duration of the HIGH output state of latching comparator 28.

From the foregoing specification it will be clear to those skilled in the art that the present invention is not limited to the specific embodiment described and illustrated and that numerous modifications and changes are possible without departing from the scope of the present invention. For example, the invention as described above uses a visible HeNe laser beam and a closed circuit television camera to provide a trip signal that appears when an edge or feature on an object is positioned at the predetermined location. The light source need not be a HeNe laser device, however, and the television camera can, for example, be replaced with a Vidicon camera, a line-scan camera, or a photosensor. Additionally, the detector electronics circuit can be modified to generate a trip signal upon the removal of an object from a particular location.

The detector electronics circuit shown in FIGS. 2 and 3 includes a latching circuit 28 and relay 30. However, not all applications will require one or both of these components. The output signal provided by comparator 26 includes sufficient information regarding object location for some applications.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:
1. A non-contacting sensing system for determining the position of a movable object, comprising:
   means for projecting a light beam;
   means for focusing said light beam at a predetermined location, said object being positionable at said location;
   means for sensing the intensity of light reflected from said location and generating a video signal representative of the intensity of said reflected light;
   a peak follower circuit coupled to receive said video signal; and means for detecting a change in the output of said peak follower circuit indicative of a change of position of said object relative to said location.

2. Apparatus according to claim 1, wherein said light beam projecting means comprises means for producing a visible HeNe laser beam.

3. Apparatus according to claim 1, wherein said detecting means comprises:
means for comparing the output signal of said peak follower circuit to a reference signal.

4. Apparatus according to claim 3, wherein said detecting means further comprises:
a latching circuit responsive to the output of said comparing means to provide an activating signal; and
a relay circuit responsive to said activating signal to generate a trip signal indicative of the presence of said object at said predetermined location.

5. A non-contacting sensing system for determining the position of a movable object, comprising:
means for projecting a light beam;
means for focusing said light beam at a predetermined location, said object being positionable at said location;
a scanning device responsive to the intensity of light reflected from said location to generate a video signal;
a peak follower circuit coupled to receive said video signal; and
means for comparing the output signal of said peak follower circuit to a reference signal and generating a binary signal indicative of the position of said object relative to said location, said binary signal having a first value when said object is present at said location and having a second value when said object is not present at said location.

6. Apparatus according to claim 5 and further comprising:
a latching circuit responsive to the output of said comparing means to provide an activating signal; and
a relay circuit responsive to said activating signal to generate a trip signal indicative of the presence of said object at said predetermined location.

7. Apparatus according to claim 5, wherein said scanning device comprises a television camera.

8. Apparatus according to claim 5, wherein said projecting means comprises means for producing a visible HeNe laser beam.

9. A non-contacting sensing system for determining the position of a movable object, comprising:
means for projecting a visible HeNe laser beam;
means for focusing said laser beam at a predetermined location, said object being positionable at said location;
a television camera positioned to view said predetermined location, said camera being responsive to produce a video signal;
a peak follower circuit coupled to receive said video signal;
means for comparing the output of said peak follower circuit to a reference signal;
a latching circuit responsive to the output of said comparing means to provide an activating signal; and
a relay circuit responsive to said activating signal to generate a trip signal indicative of the presence of said object at said predetermined location.

10. A method for determining the position of a movable object without physically contacting said object, said method comprising the steps of:
projecting a light beam;
focusing said light beam at a predetermined location, said object being positionable at said location;
sensing the light reflected from said location;
generating a video signal representative of the intensity of the reflected light;
generating a derivative signal corresponding to the envelope of said video signal; and
comparing said derivative signal with a reference signal to determine the position of said object relative to said location.

* * * * *